July 21, 1931.  R. A. COLE  1,815,049

WORK SIZE MECHANISM FOR GRINDING MACHINES

Filed July 8, 1927   2 Sheets-Sheet 1

Witnesses

W. Russell Greenwood

Harold W. Eaton

Inventor

Raymond A. Cole

By Clayton L. Jenks

Attorney

July 21, 1931.  R. A. COLE  1,815,049
WORK SIZE MECHANISM FOR GRINDING MACHINES
Filed July 8, 1927   2 Sheets-Sheet 2
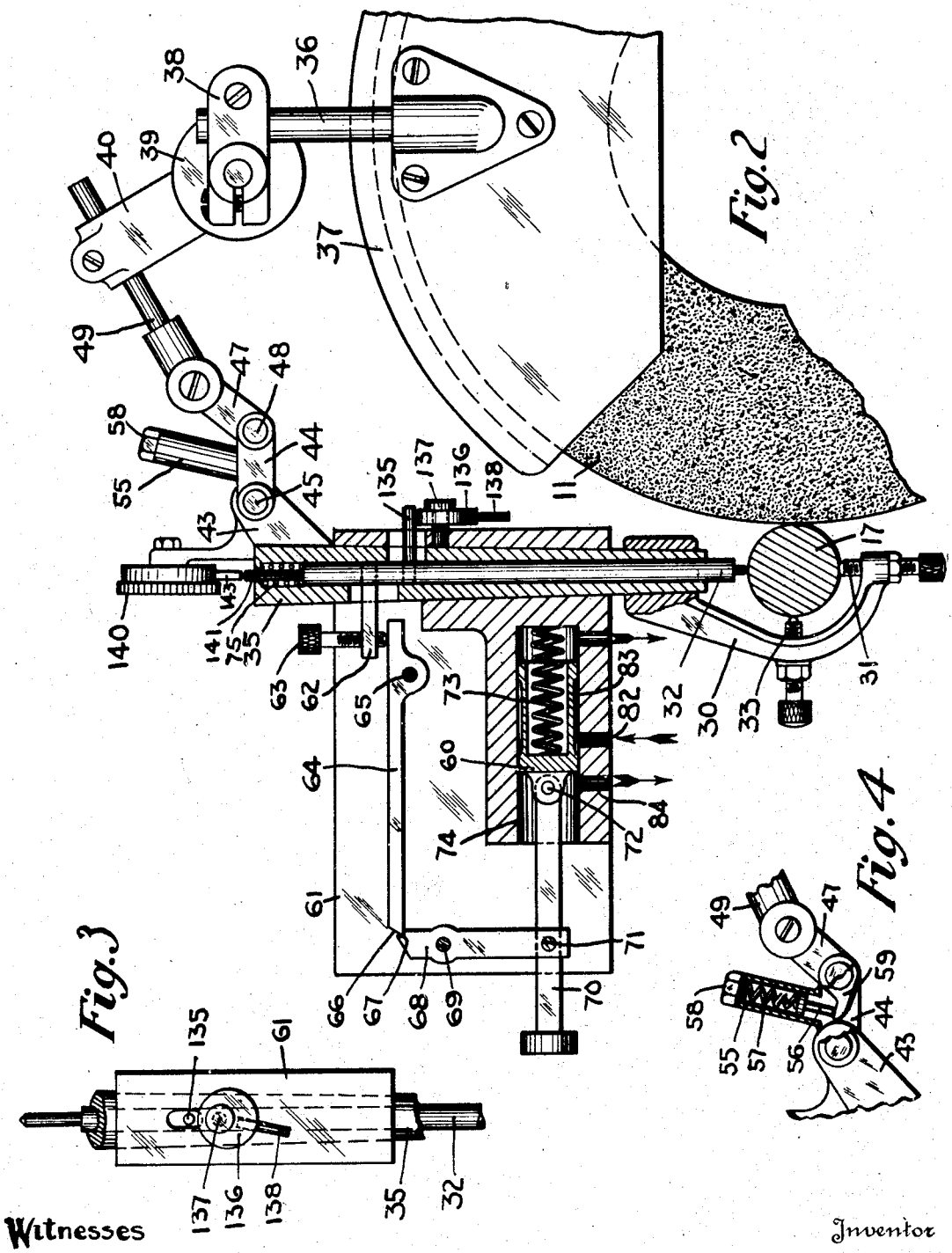
Witnesses
W Russell Greenwood
Harold W. Eaton
Inventor
Raymond A Cole
By Clayton L Jenks
Attorney Patented July 21, 1931

1,815,049

UNITED STATES PATENT OFFICE

RAYMOND A. COLE, OF WORCESTER, MASSACHUSETTS, ASSIGNOR TO NORTON COMPANY, OF WORCESTER, MASSACHUSETTS, A CORPORATION OF MASSACHUSETTS

WORK SIZE MECHANISM FOR GRINDING MACHINES

Application filed July 8, 1927. Serial No. 204,390.

My invention relates to grinding machines and more particularly to a machine adapted for grinding cylindrical work which has a work measuring device associated therewith.

The standard cylindrical grinding machine comprises a micrometer feed mechanism which has a stopping device so arranged that the operator may feed the grinding wheel into the work until the stopping device becomes effective to prevent further forward feeding movement of the wheel. Various types of measuring instruments have also been utilized on grinding machines which automatically indicate the size of the work. It has been proposed to combine such a work measuring device with a wheel feed mechanism so that the forward feed of the grinding wheel may be stopped automatically when the work has been ground to a predetermined size. It has been found difficult heretofore to govern feeding mechanism of sufficiently powerful construction to effect a rapid feed with that degree of nicety required by high precision grinding. Tripping devices operating under heavy pressure or contacts operated under high voltage have proved uncertain in their action and to be readily affected by wear or pitting. With these considerations in mind my invention consists, in one of its aspects, in a delicately controlled actuating system responsive to the action of a work measuring or calipering device, in combination with a separate strongly controlled system for directly operating the feeding mechanism but being governed by the action of the delicately controlled system. In this way the duty of the calipering device may be reduced to some such function as, for example, the tripping of a nicely balanced latch under light pressure, while the full power of the system controlled thereby may be utilized merely to operate a valve or close a switch in the system adapted for the heavier duty of actuating the feeding mechanism. A further difficulty has been found in the fact that the size finding or calipering devices as heretofore employed have ordinarily involved a single movable contact member associated with a fixed part of the device to make the measurement. Such a device purports to measure a radius of the work, and the measurement will depend necessarily upon the work being exactly centered relative to the measuring contact member; hence any change in position of the supposedly fixed portion of the device affects the measurement of the work. It is therefore desirable to measure a diameter of the work without reference to any fixed portion of the machine so that variations in position of the measuring device will not affect the indicated measurement. Various other objectionable characteristics are found in such devices.

It is therefore the primary object of my invention to overcome the difficulties heretofore met and to provide a grinding machine with an automatic work sizing device which operates mechanically to stop the grinding action when the work has reached a predetermined size, and particularly to provide a simple device of this type which will operate without requiring a large amount of attention on the part of a skilled operator.

With this and other objects in view as will be apparent to one skilled in the art, my invention resides in the combination of parts set forth in the specification and covered by the claims appended hereto.

In accordance with my invention, I have found that the work may be measured during the grinding operation and the measuring instrument employed to stop the grinding action by removing the grinding wheel from its operative relation with the work. To this end, I provide a grinding machine with a cross feed mechanism by means of which the grinding wheel may be fed toward and from the work and with a work sizing device so constructed and arranged that it automatically determines the diameter of the work during the grinding operation. In order that the grinding action may be stopped automatically, the mechanism is so arranged and controlled by the sizing device that it will move the wheel away from the work when the latter has been reduced to the required size. This is preferably accomplished by means of a fluid pressure mechanism so constructed and arranged that it may operate the wheel feed, and the size finding device is arranged to operate a valve which controls the fluid presure mechanism, so as to cause the fluid pressure to move the wheel slide away from the work when a feeler in contact with the work reaches a predetermined position.

Referring more particularly to the drawings which illustrate one embodiment of my invention;

Fig. 2 is a fragmentary view, partly in section, of the diameter finding device and the valve control mechanism;

Fig. 3 is a fragmentary elevation showing a cam device for rendering the diameter finder inoperative; and Fig. 4 is a detail sectional view showing the spring connection for maintaining the apparatus in operative contact with the work.

Figure 1:
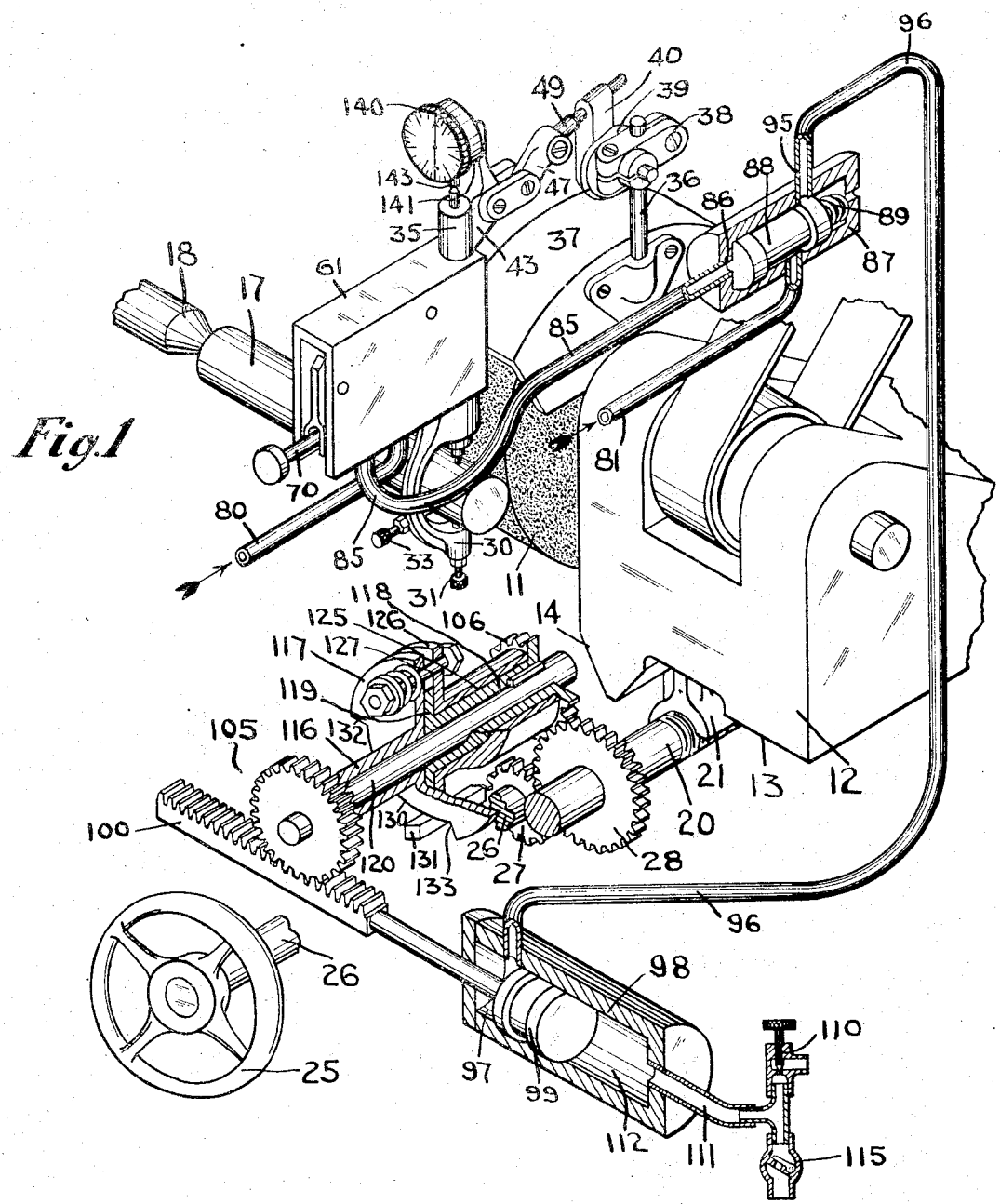
Figure 1 is a perspective view showing somewhat diagrammatically the arrangement of a grinding wheel slide associated with a pneumatic feed mechanism and a valve controlling diameter finder.

As illustrated in the drawings, a cylindrical grinding machine may comprise a grinding wheel 11 rotatably mounted on a wheel slide 12 which has a flat way 13 and a V-way 14 adapted to mate with corresponding ways on the machine base (not shown). The work piece 17 is mounted on centers 18, only one of which is shown in the drawings. This feature is old and well known in cylindrical grinding machines, such as that shown in the prior patent to Norton No. 762,838 of June, 1904.

To move the grinding wheel toward and from the work, I may utilize any suitable wheel feeding mechanism, either manually or power operated to produce the desired feeding action. As shown in the drawings, I provide a feed screw 20 mounted in suitable bearings in the base of the machine. A half nut 21 depends from the wheel slide 12 and engages the thread on the cross feed screw 20. The feed screw 20 may be turned by any suitable mechanism, such as shown in the prior patent to Norton, to feed the grinding wheel toward and from the work. In the simplified construction illustrated in the drawings, I provide a manually operable mechanism comprising a hand wheel 25 mounted on the outer end of the shaft 26 which is in turn supported in suitable bearings in the machine base. The inner end of the shaft 26 is provided with a small gear 27 meshing with a larger gear 28 on the outer end of the feed screw 20. By turning the hand wheel 25 in either direction, the operator may feed the grinding wheel toward or from the work according to the direction desired.

To attain the object of my invention, I utilize a mechanism which has feelers contacting with the work at opposite sides and on a diameter, and which serves, when the work has been ground to a predetermined size, to operate automatically to turn the feed screw in such a direction as to remove the grinding wheel from operative contact with the work. As illustrated in the drawings, I provide a gauging or calipering device 30 having an adjustable contact member 31 adapted to engage the lower surface of the work and an opposed plunger or feeler rod 32 adapted to contact with the work at a point diametrically opposite the member 31. An adjustable contact member 33 is provided to position the contact members 31 and 32 so that they will measure the finished work on a diametrical line. The plunger 32 is slidably mounted in the sleeve 35 which is supported by a bracket 36 on the wheel guard 37.

The sleeve 35 may be supported on any fixed part of the machine, but in the simplified construction illustrated in the drawings, I have shown it as supported by a bracket 36 on the wheel guard 37. The bracket 36 is provided with an adjustable supporting member 38 having a swivel friction joint 39 carrying the arm 40. This construction permits the operator to swing the measuring or calipering member 30 upward and out of contact with the work into an inoperative position. The upper end of the sleeve 35 is provided with a projection 43 pivoted to the links 44 by a pin 45. The links 44 are pivotally connected to a link 47 by a pin 48 which in turn is pivoted to the adjustable supporting member 49. The member 49 is adjustably clamped to the arm 40.

In order that the lower contact member 31 may be moved upwardly as the work is ground away, I provide a spring connection between the links 44 and 47. As illustrated in Fig. 4, this comprises a cylinder 55 integrally formed with the link 44. Within the cylinder is a spring actuated plunger 56 having a spring 57 interposed between the upper end of the plunger 56 and the cylinder head 58 so that the plunger exerts a downward pressure. The link 47 is provided with a projection 59 which contacts with the lower end of the plunger 56. It will be readily seen that the tension of the spring 57 exerts an upward pressure on the contact member 31 so that as the work is reduced in size, the member 31 will be maintained in operative contact therewith.

In order that the feed screw 20 may be turned to move the grinding wheel rearwardly the instant the work has been reduced to the desired size, I may provide any suitable mechanism to cooperate with the calipering mechanism. As illustrated in the drawings, I may employ a fluid pressure operated device to turn the feed screw, and the flow of fluid thereto is controlled by a valve which in turn is operated or controlled by the measuring device. As illustrated the wheel is moved by a piston and cylinder device and the fluid is admitted to the cylinder through a valve mechanism comprising a plunger 60 which is actuated by a trip lever when the work has been reduced to a given size. The plunger 32 is provided with a projecting arm 62 having an adjustable screw 63 passing therethrough. The lower end of the screw 63 contacts with the short arm of the trip lever 64 which is pivoted on the pin 65 extending between the sides of a casing 61 which is rigidly secured to and carried by the sleeve 35. The other end of the lever 64 is provided with a knife edge 66 engaging a notch 67 in the upper end of the lever 68 which is pivoted on the pin 69 in the casing 61. The lower end of lever 68 is pivotally connected by means of a pin 71 to a link 70 which is extended forwardly outside the casing 61 and provided with a head. This link is in turn connected to the outer end of the piston 60 by a pin 72. The piston 60 is preferably of a hollow construction and is provided with a spring 73 interposed between the inner end of the hollow portion of the piston and the end of the cylinder 74, this spring serving to push the piston outwardly when the lever 68 is released.

It will be readily apparent that as the work is being reduced in size the plunger 32 is held in contact with the upper surface of the work by a spring 75. As the plunger 32 moves downwardly during the grinding operation and the lever 64 moves upwardly with the casing 61, the screw 63 moves the short arm of the lever 64 downwardly so that the knife edge 66 trips and disengages the notch 67. As this takes place the released tension of the spring 73 moves the valve piston 60 toward the left as viewed in Fig. 2 to open the air ports and actuate the wheel feed mechanism.

The wheel feed mechanism is preferably actuated by a fluid operated device in which the fluid is under a high pressure. In order, however, that the delicate tripping mechanism may not be subjected to such high pressure, I prefer to utilize two control valves, one a low pressure device controlled by the trip lever and the other a high pressure device controlled by the first. As diagrammatically shown in Fig. 1, I have illustrated two separate pipe lines 80 and 81 arranged respectively for a low and high pressure fluid. The pressure regulating valve in pipe line 80, being of an old and well known construction, has not been illustrated. Fluid pressure passing through the low pressure pipe 80 enters the port 82 in the cylinder 74. The valve piston 60 has its two end portions fitting the cylinder wall and separated by a reduced portion forming a fluid passage 83. When the mechanism trips and permits the piston to move toward the left (as viewed in Fig. 2) fluid under pressure is passed through this passage 83 from the port 82 to the exhaust port 84 and thence by a connecting pipe 85 to the port 86 into the end of a second cylinder chamber in the cylinder 87.

This second device is of the same general construction as the first. In that device, the fluid pressure moves the piston valve 88 toward the right (as viewed in Fig. 1) against the pressure of the spring 89. This movement of the valve piston 88 permits air under pressure in the pipe 81 to pass through the exhaust port 95 to the pipe 96 and into the cylinder chamber 97 in the wheel feed actuating cylinder 98. This moves the piston 99 toward the right (as viewed in Fig. 1) thereby moving the rack bar 100, connected thereto, in the same direction. A gear 105 meshed with the rack 100 is connected with a gear 106 meshing with the gear 28 on the outer end of the feed screw 20. It will be readily apparent that as the air under pressure is admitted to the cylinder chamber 97 the piston 99 will be moved rapidly toward the right, thereby moving the rack 100 and rotating the gears 105, 106 and 28 to turn the feed screw and remove the grinding wheel from operative contact with the work piece. This takes place only when the trip device releases the valve piston 60.

In order that the movement of the piston 99 toward the right (as viewed in Fig. 1) may be controlled, I provide a throttle valve 110 which is connected by means of a pipe 111 to the cylinder chamber 112. By adjusting the opening of the throttle valve 110, the exhausting of air from the chamber 112 may be controlled to give the desired rate of movement to the piston 99. To permit turning the feed mechanism in the reverse direction, that is, in a counterclockwise direction, to feed the grinding wheel toward the work without undue resistance on the part of the cylinder 98 and piston 99, I provide a check valve 115 connected to the pipe 111. As the hand wheel 25 is turned to feed the grinding wheel manually toward the work, the feed screw 20 rotates the gears 28, 106 and 105 and moves the rack 110 and piston 99 toward the left, and the air pressure on the outer side of the check valve 115 to open and allow air to be admitted freely into the cylinder chamber 112.

To permit the feed mechanism to be rotated to remove the grinding wheel rearwardly through the desired distance, I may utilize any suitable friction device between the piston 99 and the feed screw 20 so that if the piston 99 is moved only through a limited stroke it will at the same time permit a further movement of the feeding mechanism. As illustrated in the drawings, I form the gear 105 on the outer end of a sleeve 116. The inner end of the sleeve 116 is provided with a flange 117. A sleeve 118 having a friction flange 119 narrower than the flange 117 is keyed to the shaft 120. Surrounding the sleeve 118 is a second sleeve 125 having a wide flange 126 engaging the opposite side of the friction flange 119. A plurality of bolts 127 are provided passing through the flanges 117 and 126 so that the friction between the flanges may be varied as desired. It will be apparent from this construction that as the gear 105 is turned by the rack 100, this motion will be transmitted through the friction flanges to the shaft 120 to turn the gear 106 which is keyed to the shaft and thereby turn the feed screw 20.

To limit the movement of the piston mechanism, I provide a cut out portion 130 in the flange 117 adapted to engage a fixed projection 131 of the base of the machine. It will be apparent from this construction, that as air is admitted through pipe 96, the rack 100 will turn the gear 105 to cause a rearward movement of the grinding wheel 11 until the end face 132 of the cut out portion 130 contacts with the fixed projection 131 thereby limiting the movement of the piston mechanism. The operator may, however, continue the rearward movement of the grinding wheel 11 by turning the hand wheel 25 against the friction of the flanges 117, 119 and 126. Likewise, on the forward feeding movement of the grinding wheel, the manual turning of the feed screw rotates the gear 106 and the friction device and moves the piston 99 into the position shown in Fig. 1. This movement of the piston continues until the other end face 133 of the portion 130 contacts with the projection 131. The feeding movement to size the work is then accomplished by continued turning of the hand feed wheel 25 against the friction of the flanges to feed the grinding wheel into the work.

To permit resetting the tripping mechanism when there is no piece of work in the machine, for example, when it is desired to true the wheel, I may utilize any suitable mechanism to withdraw the plunger and hold the tripping mechanism against movement until the contact members 31 and 33 are in operative contact with the next piece of work. As illustrated in the drawings, I provide the plunger 32 with a projecting pin 135 passing through an opening in the sleeve 35 and the main frame 61 of the trip mechanism. Below the pin 135 I mount a cam or eccentric 136 on a pin 137 fixed to the frame 61. To reset the trip mechanism, the operator turns the cam 136 by means of a handle 138 to raise the pin 135 and thereby remove the plunger 32 from operative contact with the work. This movement separates the screw 63 from the short arm of the lever 64 thereby permitting the operator to push the lever 70 toward the right as viewed in Fig. 1 so that the knife edge 66 will drop into the notch 67 and thereby bring the part into an operating position.

The operation of my mechanism will be readily apparent from the foregoing disclosure. The calipering mechanism 30 is first swung from an inoperative position into the position shown in Fig. 2. The operator then adjusts the screw 63 so that it will trip the knife edge 66 when the required work size has been attained. This causes air in the low pressure system to flow through the pipe 85 and so move the plunger 88 and thereby admit air into the cylinder chamber 97 of the high pressure system and move the piston 99. This results in the grinding wheel being removed from the work, when the latter has reached the predetermined size. After the piece of work has been sized, the operator swings the calipering device 30 and the main frame 61 of the trip mechanism toward the left as viewed in Fig. 2 and then upwardly into an inoperative position out of contact with the work. The finished piece of work may then be removed and replaced by a new piece of work. The operator then swings the calipering device downwardly and into operative contact with the new piece of work. This raises the plunger 32 so that the screw 63 is out of contact with the short arm of the lever 64. The lever 70 is then moved toward the right into the position shown in Fig. 2 to permit the lever 64 to drop so that the knife edge 66 contacts with the notch 67 thereby resetting the trip mechanism. The mechanism, once it has been set to conform to the size of the first piece of finished work, thereafter serves to stop the grinding operation for each piece subsequently ground so that it will be a duplicate in size of the first. This is done irrespective of wheel wear or position of the work since the measurement is made on a diameter of the work. It will also be understood that a dial indicator 140 of any suitable type may be arranged to cooperate with the plunger 32 to show the size of the work on a visible scale. This indicator is diagrammatically shown on the drawings, (Fig. 1), in which the upper reduced end 141 of the plunger 32 contacts with the plunger 143 of the dial indicator 140.

Having thus described my invention, what I claim as new and desire to secure by Letters Patent is:

1. In a grinding machine, a work support and grinding element relatively movable to effect a grinding feed, feeding mechanism, a calipering device, a fluid pressure system operating under low pressure and including a valve governed by said calipering device, and a high pressure system for operating the feeding mechanism controlled in its action by the valve of said low pressure system.

2. In a grinding machine, a work support and grinding element relatively movable to effect a grinding feed, feeding mechanism, a calipering device, a fluid pressure system operating under low pressure and including a controlling valve directly governed by said calipering device, and a high pressure system for actuating the feeding mechanism and including a second valve arranged to be operated by the low pressure system.

3. In a grinding machine, a work support and grinding element relatively movable to effect a grinding feed, feeding mechanism, a calipering device, a low pressure system including a controlling valve arranged to be latched under spring tension during the grinding operation and to be tripped by said calipering device when the work is reduced to a predetermined diameter, an independent fluid pressure system for actuating the feeding mechanism to separate the work and grinding element, and controlling means for said latter system arranged to be actuated by said low pressure system.

4. In a grinding machine, a work support and grinding element relatively movable to effect a grinding feed, feeding mechanism, a calipering device, a delicately controlled fluid pressure system responsive to the action of the calipering device and including a valve arranged to be latched under tension, and a separate fluid pressure controlled system for operating the feeding mechanism and being governed in its action by the tripping of said valve.

5. In a grinding machine, a work support and grinding element relatively movable to effect a grinding feed, feeding mechanism, a calipering device, a fluid pressure actuating system operating under low pressure, a caliper-controlled latch, a valve positioned by said latch to interrupt fluid flow in said system, and a high pressure system for actuating the feeding mechanism including a controlling valve arranged to be operated by said low pressure system.

6. In a grinding machine, a work support, a grinding element, manually operated means for feeding the grinding element into the work, fluid pressure operated mechanism for moving the grinding element away from the work, a caliper device, a valve controlled thereby for timing the action of said fluid pressure mechanism, and separate means for governing the extent of its action.

7. In a grinding machine, a work support, a grinding element, manually operated means for feeding the grinding element into the work, fluid pressure operated mechanism for moving the grinding element away from the work, including a slip connection, a stop cooperating with said slip connection for limiting the extent of the action of said mechanism, and a caliper controlled valve for timing its operation.

8. In a grinding machine, a work support, a grinding element, manually operated means for feeding the grinding element into the work, automatic mechanism fo moving the grinding element way fro. 1 1 he work, including a fluid pressure cylinde. and a train of gears arranged to be actuated thereby, means for limiting the action of the train in one direction, a slip connection between said manually operated means and said train of gears permitting the feeding movement to be carried out independently of the train of gears, and a caliper device for timing the operation of said train.

9. In a grinding machine having a work support and grinding wheel mounted for relative movement, fluid-actuated mechanism for feeding one toward the other, and a calipering device for controlling the same including a sleeve with a sliding contact rod for engaging one side of the work and an oppositely disposed contact member for engaging the other side of the work, a casing carried by said sleeve and a latch-controlled valve located in the casing and arranged to be tripped in the relative movement of the sleeve and contact rod as the diameter of the work is reduced.

10. In a grinding machine, a work support and grinding element relatively movable to effect a grinding feed, feeding mechanism, a fluid pressure system for operating the same including a controlling valve, a fluid pressure system operating under conditions of low pressure for moving said valve and including a second valve arranged to be latched under spring tension, and a caliper device arranged to trip said second valve.

11. In a grinding machine, a work support and grinding element relatively movable to effect a grinding feed, feeding mechanism, a fluid pressure system for operating the same including a controlling valve normally maintained in position to arrest fluid flow in said system, a second fluid pressure system connected to said valve for displacing the latter and including a second valve, and a caliper device for timing the action of said second valve whereby the second fluid pressure system may be rendered effective to displace said first mentioned valve and said first mentioned fluid pressure system thereby rendered effective.

Signed at Worcester, Massachusetts, this 7th day of July, 1927.

RAYMOND A. COLE.